(12) United States Patent
Pu et al.

(10) Patent No.: US 9,696,775 B2
(45) Date of Patent: Jul. 4, 2017

(54) INTEGRATED CIRCUIT WITH ON-CHIP POWER PROFILING

(71) Applicant: INTEL IP CORPORATION, Santa Clara, CA (US)

(72) Inventors: Tian Yan Pu, Dresden (DE); Chenbo Liu, Dresden (DE); Thuyen Le, Taufkirchen (DE); Lars Melzer, Dresden (DE)

(73) Assignee: INTEL IP CORPORATION, Santa Clara, CA (US)

( * ) Notice: Subject to any disclaimer, the term of this patent is extended or adjusted under 35 U.S.C. 154(b) by 188 days.

(21) Appl. No.: 14/635,607

(22) Filed: Mar. 2, 2015

(65) Prior Publication Data

US 2016/0259397 A1    Sep. 8, 2016

(51) Int. Cl.
| G06F 1/32 | (2006.01) |
| G06F 11/22 | (2006.01) |
| G06F 1/26 | (2006.01) |

(52) U.S. Cl.
CPC ............. *G06F 1/26* (2013.01); *G06F 1/3206* (2013.01); *G06F 11/2273* (2013.01)

(58) Field of Classification Search
CPC ..................................... G06F 1/32; G06F 1/26
See application file for complete search history.

(56) References Cited

U.S. PATENT DOCUMENTS

| 2006/0198211 A1* | 9/2006 | Frankowsky | G01R 31/2831 365/189.09 |
| 2007/0188184 A1* | 8/2007 | Athas | G01R 31/3004 324/750.3 |
| 2007/0229110 A1* | 10/2007 | Anazawa | G01R 31/31721 324/764.01 |
| 2009/0167318 A1* | 7/2009 | Xiong | G01R 31/3004 324/555 |
| 2010/0289339 A1* | 11/2010 | Jung | G06F 1/28 307/80 |
| 2016/0313370 A1* | 10/2016 | Neeb | G01R 1/025 |

\* cited by examiner

*Primary Examiner* — Phil Nguyen
(74) *Attorney, Agent, or Firm* — Schwabe, Williamson & Wyatt, P.C.

(57) ABSTRACT

Embodiments include apparatuses, methods, and systems for determining a power consumption of a circuit block in an integrated circuit. The integrated circuit may include first and second power supply networks. In some embodiments, the integrated circuit may include a plurality of instances of a circuit block under test. A first instance of the circuit block may be coupled to the first power supply network during a first test run, and a second instance of the circuit block may be coupled to the second power supply network during a second test run. In other embodiments, a single instance of a circuit block under test may be coupled with the first power supply network during a first test run and coupled with the second power supply network during a second test run. The power consumption of the circuit block may be determined based on the first and second test runs.

19 Claims, 6 Drawing Sheets

During a first test run, coupling the circuit block under test to a first power supply network of the circuit, and uncoupling the circuit block under test from a second power supply network of the circuit     502

During a second test run, uncoupling the circuit block under test from the first power supply network, and coupling the circuit block under test to the second power supply network     504

Determining a first difference between a power consumption of the first power supply network and a power consumption of the second power supply network for the first test run     506

Determining a second difference between a power consumption of the first power supply network and a power consumption of the second power supply network for the second test run     508

Determining a power consumption of the circuit block under test based on the first and second differences     510

INTEGRATED CIRCUIT WITH ON-CHIP POWER PROFILING

FIELD

Embodiments of the present invention relate generally to the technical field of electronic circuits, and more particularly to an integrated circuit with on-chip power profiling.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Integrated circuits typically include multiple circuit blocks on the same chip. It may be helpful to know the power consumption of specific circuit blocks of the integrated circuit.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments include apparatuses, methods, and systems for determining a power consumption of a circuit block in an integrated circuit. The integrated circuit may include first and second power supply networks coupled to separate power supply pins (e.g., first and second supply pins). In some embodiments, the integrated circuit may include a plurality of instances of a circuit block under test. In a first test run, a first instance of the circuit block under test may be coupled to the first power supply network (e.g., to receive power from the first power supply network) and a second instance of the circuit block under test may be uncoupled from the second power supply network (e.g., so the second instance of the circuit block does not receive power from the second power supply network). In a second test run, the first instance of the circuit block under test may be uncoupled from the first power supply network (e.g., so that the first instance of the circuit block does not receive power from the first power supply network) and the second instance of the circuit block under test may be coupled to the second power supply network (e.g., so that the second instance of the circuit block receives power from the second power supply network). The integrated circuit may further include one or more other circuit blocks coupled to the first supply network during the first and second test runs, and one or more other circuit blocks coupled to the second supply network during the first and second test runs.

Alternatively, a single instance of a circuit block under test may be coupled to the first power supply network and uncoupled from the second power supply network during the first test run, and may be coupled to the second power supply network and uncoupled from the first power supply network during the second test run. This technique may be used, for example, when the integrated circuit includes only one instance of the circuit block under test, although it may also be used when the integrated circuit includes multiple instances of the circuit block under test.

The power consumption of the circuit block under test may be determined based on the first and second test runs (e.g., by a test circuit coupled to the first and second supply pins). For example, the test circuit may determine a first difference between a power consumption of the first power supply network and a power consumption of the second power supply network for the first test run. The test circuit may further determine a second difference between a power consumption of the first power supply network and a power consumption of the second power supply network for the second test run. The test circuit may determine the power consumption of the circuit block under test based on the first and second differences. For example, the power consumption of the circuit block under test may be equal to half of a difference between the first and second differences.

Figure 1:
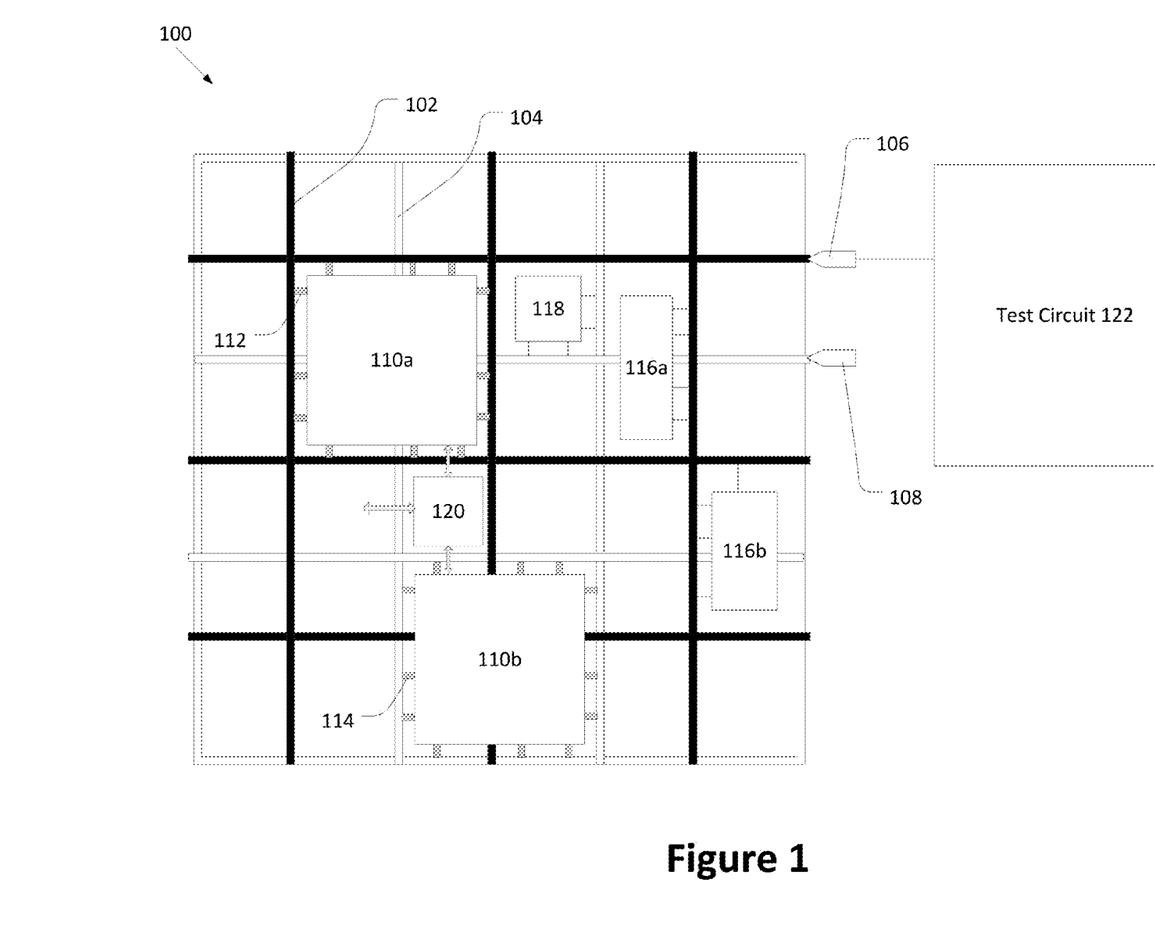
FIG. 1 illustrates an integrated circuit with on-chip power profiling, in accordance with various embodiments.

FIG. 1 illustrates an integrated circuit 100 (hereinafter "circuit 100") that includes a plurality of instances of a circuit block to be power profiled, in accordance with various embodiments. The circuit 100 may include a first power supply network 102 and a second power supply network 104. The first power supply network 102 may be coupled to a first supply pin 106 to receive a first power supply, and the second power supply network 104 may be coupled to a second supply pin 108 to receive a second power supply. Although circuit 100 is shown in FIG. 1 with two power supply networks, in other embodiments the circuit 100 may include additional power supply networks.

In various embodiments, the circuit 100 may include a plurality of circuit blocks, including first and second instances of a same circuit block 110, referred to as circuit block 110a and circuit block 110b, respectively. The circuit blocks 110a and 110b may have a same design (e.g., circuit layout or function). The circuit block 110a may be coupled with the first power supply network 102 by one or more power switches 112, while the second circuit block 110b may be coupled with the second power supply network 104 by one or more power switches 114. In some embodiments, the circuit 100 may further include one or more additional instances of the circuit block 110. The additional circuit blocks 110 may be coupled with either the first power supply network 102 or the second power supply network 104.

In various embodiments, the circuit 100 may further include one or more other circuit blocks 116a-b coupled with the first power supply network 102 and one or more other circuit blocks 118 coupled with the second power supply network 104. The circuit blocks 116a-b and 118 may be of different circuit designs than the circuit block 110. Additionally, in some embodiments, the additional instances of the circuit block 110 other than the circuit block 110a and circuit block 110b may be included in the group of other circuit blocks 116a-b or 118 (e.g., depending on whether the instance of the circuit block 110 is powered by the first power supply network 102 or the second power supply network 104). Thus, only two instances of the circuit block 110 may be used to test the power consumption of the circuit block 110 in some embodiments.

In various embodiments, the circuit 100 may further include a switch box 120 coupled to the circuit block 110a and the circuit block 110b. The switch box 120 may receive an input data signal and may pass the input data signal to either the circuit block 110a or the circuit block 110b, as further discussed below.

In various embodiments, a test circuit 122 may be coupled to the circuit 100 to determine the power consumption of the circuit block 110. In some embodiments, the test circuit 122 may be external to the circuit 100. The test circuit may be coupled to the first pin 106 and the second pin 108.

During a first test run, the one or more power switches 112 may be closed to couple the circuit block 110a to the first power supply network 102, and the one or more power switches 114 may be open to uncouple the circuit block 110b from the second power supply network 104. Additionally, the switch box 120 may pass the input data signal to the circuit block 110a, and may not pass the input data signal to the circuit block 110b, during the first test run. Accordingly, during the first test run, the circuit block 110a may be powered on and active, while the circuit block 110b may not consume significant power.

During a second test run, the one or more power switches 112 may be open to uncouple the circuit block 110a from the first power supply network 102, and the one or more power switches 114 may be closed to couple the circuit block 110b to the second power supply network 104. Additionally, the switch box 120 may pass the input data signal to the circuit block 110b, and may not pass the input data signal to the circuit block 110a, during the second test run. Accordingly, during the second test run, the circuit block 110b may be powered on and active, while the circuit block 110a may not consume significant power. In some embodiments, the one or more power switches 112, the one or more power switches 114, and/or the switch box 120 may be controlled by the test circuit 122 during the first and second test runs.

In various embodiments, the test circuit 122 may determine a first difference, $pwrDelta_{run1}$, between the power consumption of the first power supply network 102 during the first test run and the power consumption of the second power supply network 104 during the first test run. The first difference $pwrDelta_{run1}$ may have a value according to Equation (1):

$$pwrDelta_{run1} = pwrNetwork1_{run1} - pwrNetwork2_{run1} = pwr_{macroblock} + pwr_A - pwr_B \quad (1)$$

where $pwrNetwork1_{run1}$ is the power consumption of the first power supply network 102 during the first test run, $pwrNetwork2_{run1}$ is the power consumption of the second power supply network 104 during the first test run, $pwr_{macroblock}$ is the power of the circuit block under test for power consumption (e.g., circuit block 110), $pwr_A$ is the power consumption of the circuit blocks 116a-b for which power is supplied by the first power supply network 102 (e.g., all circuit blocks coupled with the first power supply network 102 other than the instance of the circuit block under test (e.g., circuit block 110a)), and $pwr_B$ is the power consumption of the circuit blocks 118 for which power is supplied by the second power supply network 104 (e.g., all circuit blocks coupled with the second power supply network 104 other than the circuit block 110b (which is not coupled with the second power supply network 104 during the first test run)).

In various embodiments, the test circuit 122 may also measure a second difference, $pwrDelta_{run2}$, between the power consumption of the first power supply network 102 during the second test run and the power consumption of the second power supply network 104 during the second test run. The second difference $pwrDelta_{run2}$ may have a value according to Equation (2):

$$pwrDelta_{run2} = pwrNetwork1_{run2} - pwrNetwork2_{run2} = pwr_A - (pwr_B + pwr_{macroblock}) \quad (2)$$

where $pwrNetwork1_{run2}$ is the power consumption of the first power supply network 102 during the second test run, and $pwrNetwork2_{run2}$ is the power consumption of the second power supply network 104 during the second test run. The first and second differences may be measured using any suitable technique, such as measuring the difference in current that is consumed by the first power supply network 102 and the second power supply network 104 during a time period of the corresponding test run.

In various embodiments, the test circuit 122 may determine the power consumption of the circuit block 110 ($pwr_{macroblock}$) based on the first difference $pwrDelta_{run1}$ and the second difference $pwrDelta_{run2}$. For example, the power consumption of the circuit block 110, $pwr_{macroblock}$, may be determined according to Equation (3):

$$pwr_{macroblock} = (pwrDelta_{run1} - pwrDelta_{run2})/2 \quad (3)$$

Accordingly, the circuit 100 may be used to accurately determine the power consumption of the circuit block 110. The determined power consumption may be used to determine operating conditions of the circuit 100 (e.g., whether or when to put the circuit blocks 110 into a power-saving mode) and/or used to modify future designs in order to reduce the power consumption of the circuit block 110. It will be apparent that similar techniques, and/or the techniques described with respect to FIGS. 2, 3, and/or 4 below, may be used to determine the power consumption of other circuit blocks (e.g., one or more of circuit blocks 216 or 218) of the circuit 100 in some embodiments.

Additionally, the circuit 100 may allow the measurement of the power consumption of circuit block 110 without using a test circuit that is of a different design than a product circuit (e.g., the circuit that is manufactured for normal use). In some embodiments, for normal use of the circuit 100, the power supply pins 106 and 108 may be coupled to one another, thereby joining the power supply network 102 with the power supply network 104. The power supply pins 106 and 108 may be coupled to one another, for example, by the package (e.g., to a single package-level power supply pin) or on a circuit board on which the circuit 100 is disposed).

Figure 2:
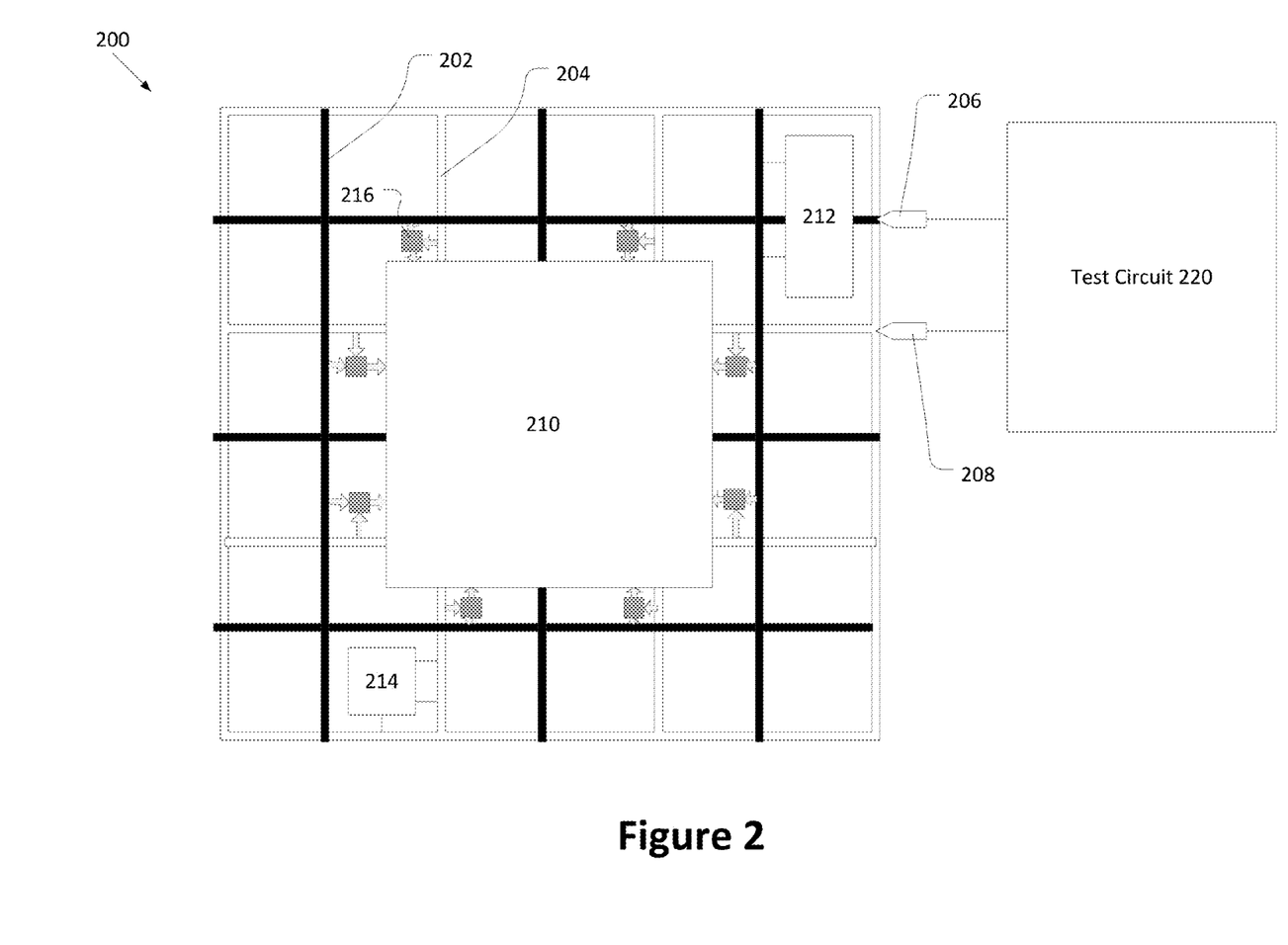
FIG. 2 illustrates another integrated circuit with on-chip power profiling, in accordance with various embodiments.

FIG. 2 illustrates a circuit 200 that includes a single instance of a circuit block to be power-profiled, in accordance with various embodiments. Similar to the circuit 100, the circuit 200 may include a first power supply network 202 and a second power supply network 204. The first power supply network 202 may be coupled to a first supply pin 206 to receive a first power supply, and the second power supply network 204 may be coupled to a second supply pin 208 to receive a second power supply. Although circuit 200 is shown in FIG. 2 with two power supply networks, other embodiments, may include additional power supply networks.

In various embodiments, the circuit 200 may include a plurality of circuit blocks, including a circuit block 210 that is to be power-profiled. The circuit 200 may further include one or more other circuit blocks 212 that are coupled to and powered by the first power supply network 202 and one or more other circuit blocks 214 that are coupled to and powered by the second power supply network 204. In some embodiments, the circuit block 210 may be the only instance of the given circuit design included in the circuit 200.

The circuit 200 may further include a plurality of power switches 216 coupled to the circuit block 210. The power switches 216 may be further coupled with the first power supply network 202 and the second power supply network 204, and may selectively couple the circuit block 210 with either the first power supply network 202 or the second power supply network 200. That is, in a first state of the power switches 216, the power switches 216 may couple the circuit block 210 to the first power supply network 202 and not the second power supply network 204, while in a second state of the power switches 216, the power switches 216 may couple the circuit block 210 to the second power supply network 204 and not the first power supply network 202. In some embodiments, the power switches 216 may additionally be capable of coupling the circuit block 210 with both the first power supply network 202 and the second power supply network 204 and/or with neither the first power supply network 202 or the second power supply network 204. For example, the power switches 216 may couple the circuit block 210 with both the first power supply network 202 and the second power supply network 204 during normal operation of the circuit 200. Additionally, or alternatively, the power switches 216 may uncouple the circuit block 210 from both the first power supply network 202 and the second power supply network 204 during a power saving mode of the circuit 200.

In various embodiments, the circuit 200 may be coupled with a test circuit 220. The test circuit 220 may perform two test runs, similar to the test circuit 122 described above. In a first test run, the switches 216 may couple the circuit block 210 to the first power supply network 202 and not to the second power supply network 204. In a second test run, the switches 216 may couple the circuit block 210 to the second power supply network 204 and not to the first power supply network 202. The test circuit 220 may determine the power consumption of the circuit block 210 based on the first and second test runs.

For example, the test circuit 220 may measure a first difference between the power consumption of the first power supply network 202 and the second power supply network 204 during the first test run and a second difference between the power consumption of the first power supply network 202 and the second power supply network 204 during the second test run. Equations (1), (2), and (3) discussed above with respect to circuit 100 may also apply to circuit 200, where $pwrDelta_{run1}$ is the difference between the power consumption of the first power supply network 202 and the second power supply network 204 during the first test run, $pwrDelta_{run2}$ is the difference between the power consumption of the first power supply network 202 and the second power supply network 204 during the second test run, $pwrNetwork1_{run1}$ is the power consumption of the first power supply network 102 during the first test run, $pwrNetwork2_{run1}$ is the power consumption of the second power supply network 104 during the first test run, $pwrNetwork1_{run2}$ is the power consumption of the first power supply network 102 during the second test run, $pwrNetwork2_{run2}$ is the power consumption of the second power supply network 104 during the second test run, $pwr_{macroblock}$ is the power of the circuit block under test for power consumption (e.g., circuit block 210), $pwr_A$ is the power consumption of the circuit blocks 212 (e.g., all circuit blocks coupled with the first power supply network 102 other than the circuit block under test (e.g., circuit block 210)), and $pwr_B$ is the power consumption of the circuit blocks 214 (e.g., all circuit blocks coupled with the second power supply network 204 other than the circuit block 210.

Accordingly, the test circuit 220 may determine the power consumption of the circuit block 210 based on the first and second differences. For example, the power consumption of the circuit block 210 may be equal to the difference between the first and second differences divided by two.

It will be apparent that the concepts discussed with respect to circuits 100 and 200 may be combined in a single integrated circuit. For example, circuit block 210 may correspond to one of circuit blocks 116 or 118 of circuit 100, and/or circuit blocks 110a-b may correspond to circuit blocks 212 and 214 of circuit 200.

Figure 3:
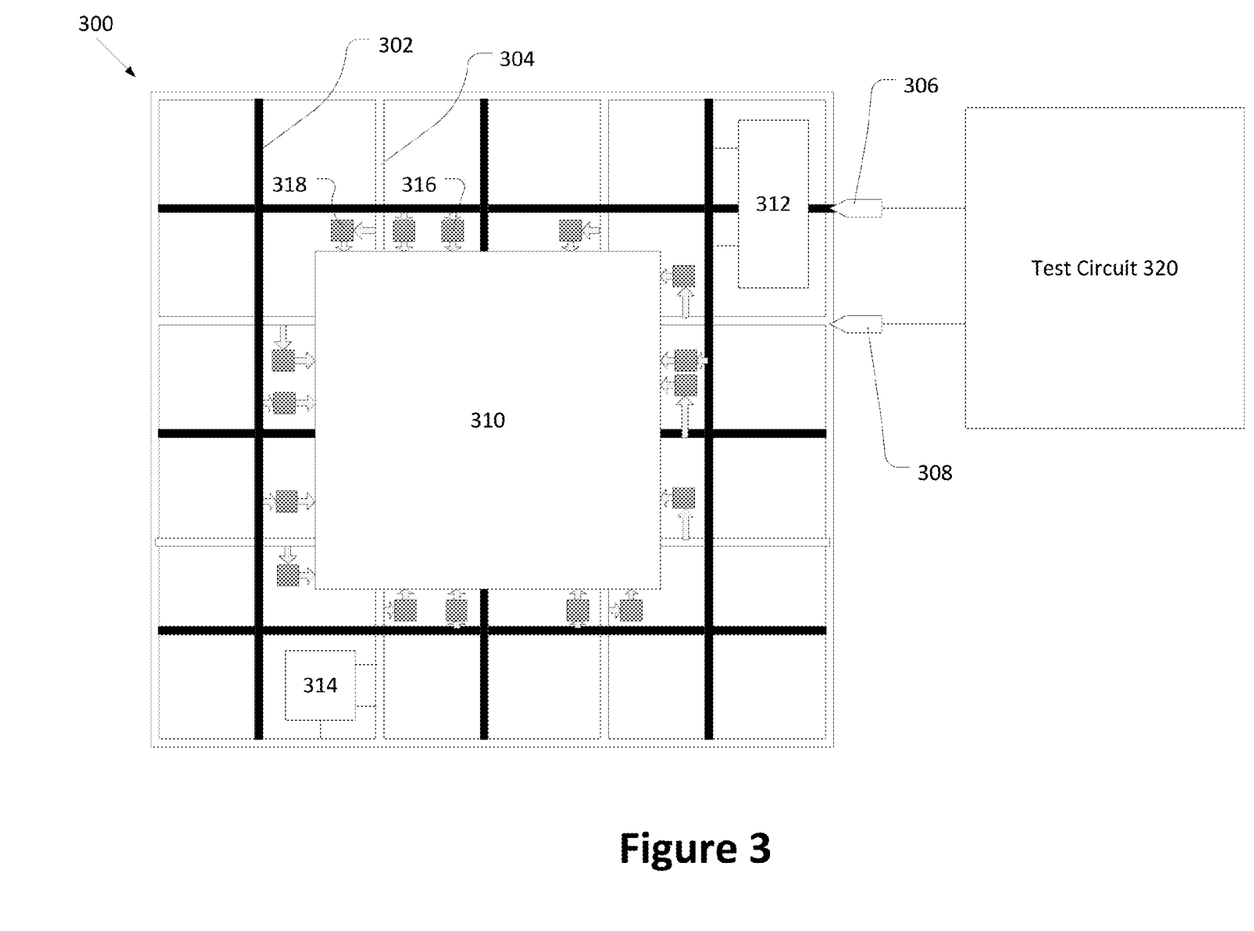
FIG. 3 illustrates another integrated circuit with on-chip power profiling, in accordance with various embodiments.

FIG. 3 illustrates a circuit 300 that shows an alternative arrangement for measuring the power consumption of a circuit block 310, in accordance with various embodiments. Circuit 300 may be similar to circuit 200, with a first power supply network 302 and a second power supply network 304. The first power supply network 302 may be coupled to a first supply pin 306 to receive a first power supply, and the second power supply network 304 may be coupled to a second supply pin 308 to receive a second power supply.

In various embodiments, the circuit 300 may include a plurality of circuit blocks, including a circuit block 310 that is to be power-profiled. The circuit 300 may further include one or more other circuit blocks 312 that are coupled to and powered by the first power supply network 302 and one or more other circuit blocks 314 that are coupled to and powered by the second power supply network 304. In some embodiments, the circuit block 310 may be the only instance of the given circuit design included in the circuit 300.

While circuit block 210 is coupled with the first power supply network 202 and the second power supply network 204 by one or more dual-input power switches 216, circuit block 310 may include separate switches to couple the circuit block 310 with the first power supply network 302 or the second power supply network 304. For example, the circuit 300 may include power switches 316 to selectively couple the circuit block 310 with the first power supply network 302 and power switches 318 to selectively couple the circuit block 310 with the second power supply network 304.

In various embodiments, a test circuit 320 may be coupled with the circuit 300 (e.g., with the power supply terminals 306 and 308) to measure the power consumption of the circuit block 310. The power consumption of the circuit block 310 may be measured using a similar process to the one described above with respect to FIG. 2. For example, in a first test run, the switches 316 may couple the circuit block 310 to the first power supply network 302 and the switches 318 may uncouple the circuit block 310 from the second power supply network 304. In a second test run, the switches 316 may uncouple the circuit block 310 from the first power supply network 302, and the switches 318 may couple the circuit block 310 to the second power supply network 304. The test circuit 320 may determine the power consumption of the circuit block 310 based on the first and second test runs (e.g., based on Equations (1), (2), and/or (3) as described above).

In some embodiments, as mentioned above, the circuit 100, 200, or 300 may include more than two power supply networks. Similar differential power consumption measurement techniques may be used when the circuit 100, 200, or 300 includes more than two power supply networks.

Figure 4:
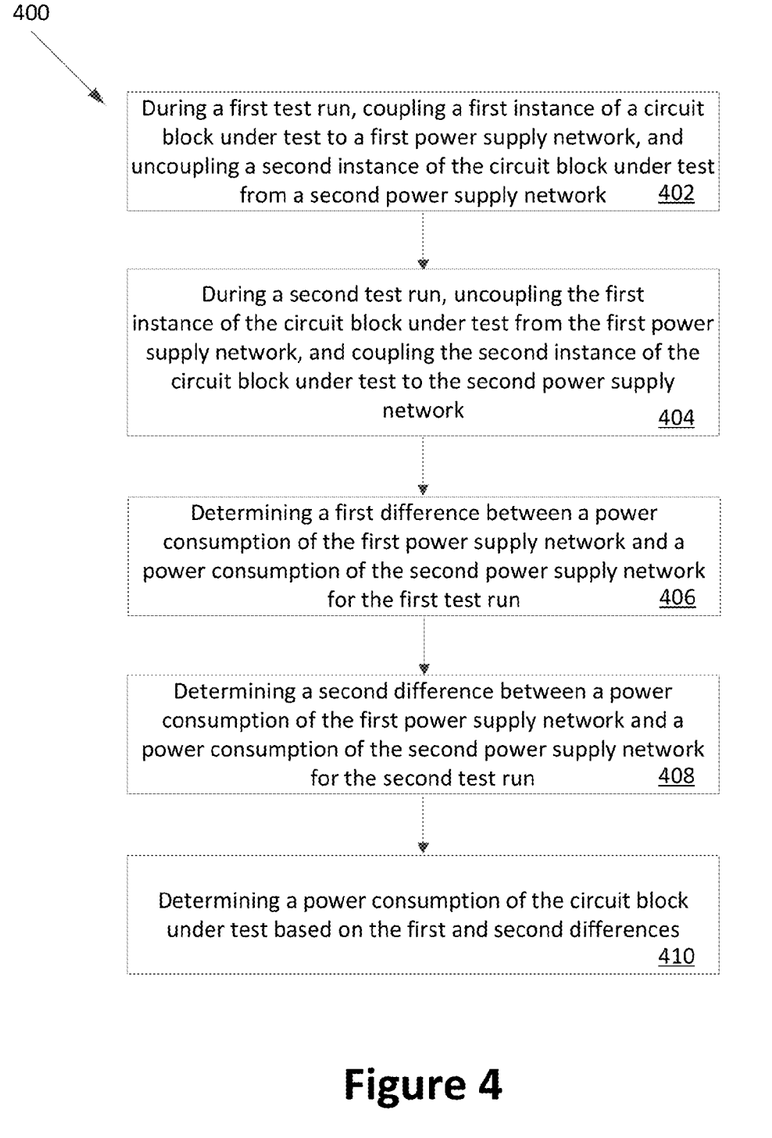
FIG. 4 illustrates a method of determining the power consumption of a circuit block in an integrated circuit, in accordance with various embodiments.

FIG. 4 illustrates a method 400 for determining a power consumption of a circuit block under test in accordance with various embodiments. The method 400 may be used, for example, to determine the power consumption of the circuit block under test when the circuit includes a plurality of instances of the circuit block. The method 400 may be performed, for example, by a test circuit (e.g., test circuit 122) and/or a circuit (e.g., circuit 100) that includes a plurality of circuit blocks including the plurality of instances of the circuit block under test. In some embodiments, a device may include one or more non-transitory, computer-readable media having instructions, stored thereon, that when executed by one or more processors of the device cause the device to perform one or more operations of the method 400.

At 402, the method 400 may include, during a first test run, coupling a first instance of the circuit block under test to a first power supply network, and uncoupling a second instance of the circuit block under test from a second power supply network.

At 404, the method 400 may further include, during a second test run, uncoupling the first instance of the circuit block under test from the first power supply network, and coupling the second instance of the circuit block under test to the second power supply network. One or more other circuit blocks, other than the first instance of the circuit block, that receive power from the first power supply network may be coupled to the first power supply network during both the first and second test runs. Similarly, one or more other circuit blocks, other than the second instance of the circuit block, that receive power from the second power supply network may be coupled to the second power supply network during both the first and second test runs.

At 406, the method 400 may include determining a first difference between a power consumption of the first power supply network and a power consumption of the second power supply network for the first test run.

At 408, the method 400 may include determining a second difference between a power consumption of the first power supply network and a power consumption of the second power supply network for the second test run. The first and second differences may be determined, for example, based on a current consumption of the first and second supply networks, as measured from respective power supply pins coupled to the first and second power supply networks.

At 410, the method 400 may include determining a power consumption of the circuit block under test based on the first and second differences. The power consumption of the circuit block under test may be determined, for example, using Equation (3) described above.

Figure 5:
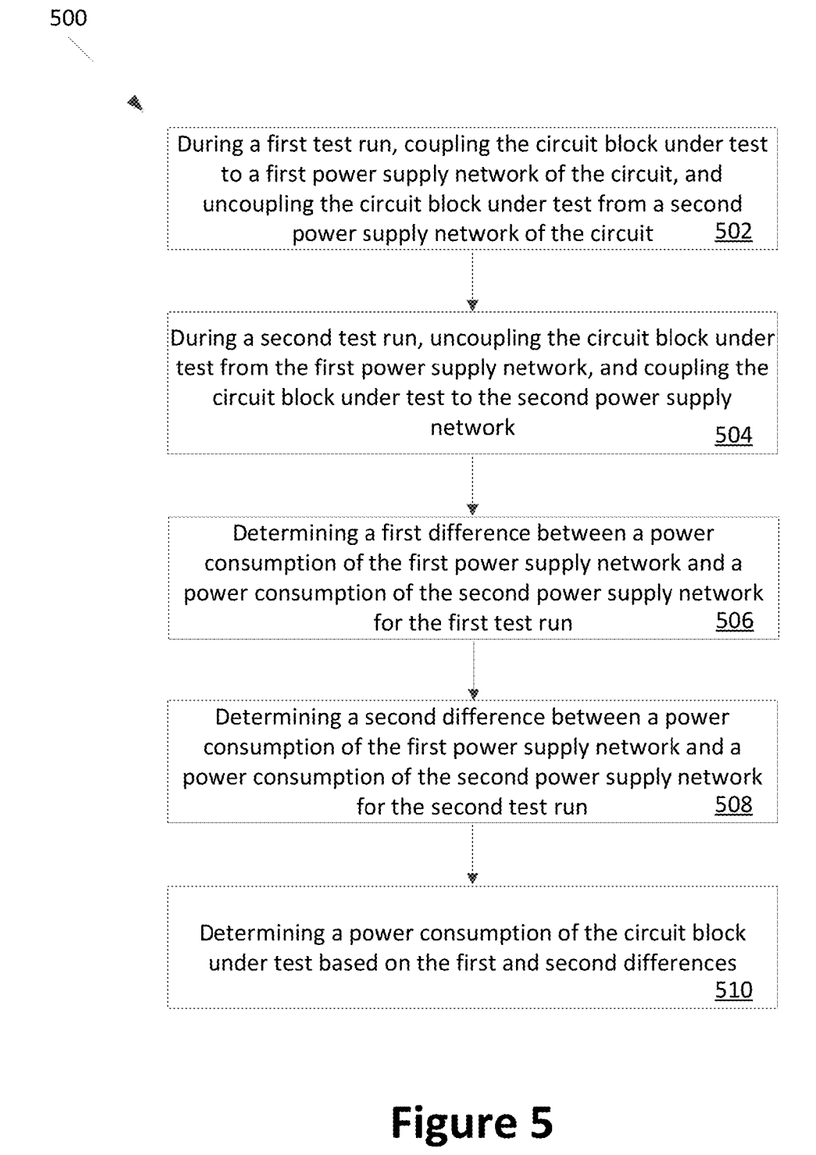
FIG. 5 illustrates a method of determining the power consumption of a circuit block in an integrated circuit, in accordance with various embodiments.

FIG. 5 illustrates a method 500 for determining a power consumption of a circuit block under test of a circuit in accordance with various embodiments. The method 500 may be used, for example, to determine the power consumption of the circuit block under test when the circuit includes a single instance of the circuit block under test. In other embodiments, the method 500 may be used with a circuit that includes a plurality of instances of the circuit block under test. The method 500 may be performed, for example, by a test circuit (e.g., test circuit 220 or 320) and/or a circuit (e.g., circuit 200 or 300) that includes a plurality of circuit blocks including the circuit block under test. In some embodiments, a device may include one or more non-transitory, computer-readable media having instructions, stored thereon, that when executed by one or more processors of the device cause the device to perform the method 500.

At 502, the method 500 may include, during a first test run, coupling the circuit block under test to a first power supply network of the circuit, and uncoupling the circuit block under test from a second power supply network of the circuit.

At 504, the method 500 may further include, during a second test run, uncoupling the circuit block under test from the first power supply network, and coupling the circuit block under test to the second power supply network. One or more other circuit blocks, other than the circuit block under test, that receive power from the first power supply network may be coupled to the first power supply network during both the first and second test runs. Similarly, one or more other circuit blocks, other than the circuit block under test, that receive power from the second power supply network may be coupled to the second power supply network during both the first and second test runs.

At 506, the method 500 may include determining a first difference between a power consumption of the first power supply network and the second power supply network for the first test run.

At 508, the method 500 may include determining a second difference between a power consumption of the first power supply network and the second power supply network for the second test run. The first and second differences may be determined, for example, based on a current consumption of the first and second supply networks, as measured from respective power supply pins coupled to the first and second power supply networks.

At 510, the method 500 may include determining a power consumption of the circuit block under test based on the first and second differences. The power consumption of the circuit block under test may be determined, for example, using Equation (3) described above.

Figure 6:
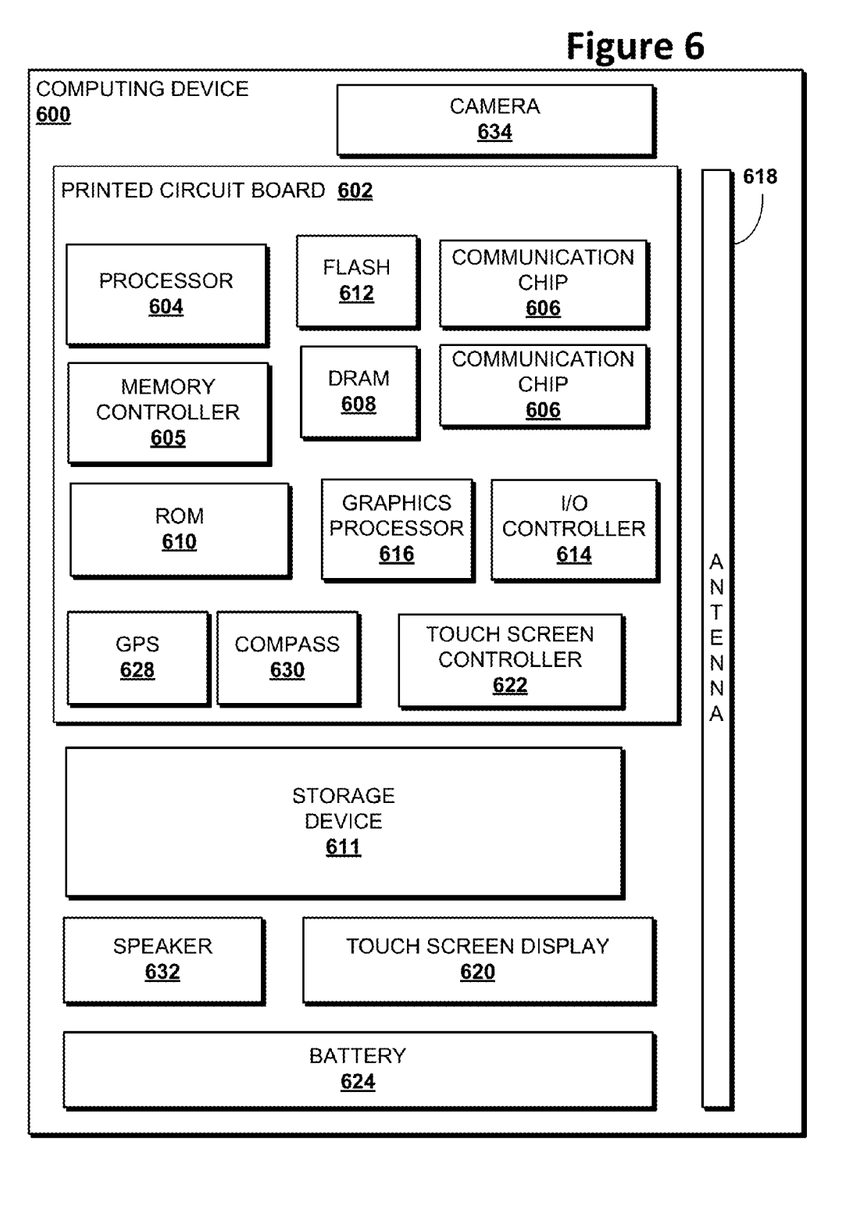
FIG. 6 illustrates an example system configured to employ the apparatuses and methods described herein, in accordance with various embodiments.

FIG. 6 illustrates an example computing device 600 that may employ the apparatuses and/or methods described herein (e.g., circuit 100, circuit 200, circuit 300, test circuit 122, test circuit 220, test circuit 320, method 400, method 500), in accordance with various embodiments. As shown, computing device 600 may include a number of components, such as one or more processor(s) 604 (one shown) and at least one communication chip 606. In various embodiments, the one or more processor(s) 604 each may include one or more processor cores. In various embodiments, the at least one communication chip 606 may be physically and electrically coupled to the one or more processor(s) 604. In further implementations, the communication chip 606 may be part of the one or more processor(s) 604. In various embodiments, computing device 600 may include printed circuit board (PCB) 602. For these embodiments, the one or more processor(s) 604 and communication chip 606 may be disposed thereon. In alternate embodiments, the various components may be coupled without the employment of PCB 602.

Depending on its applications, computing device 600 may include other components that may or may not be physically and electrically coupled to the PCB 602. These other components include, but are not limited to, memory controller 605, volatile memory (e.g., dynamic random access memory (DRAM) 608), non-volatile memory such as read only memory (ROM) 610, flash memory 612, storage device 611 (e.g., a hard-disk drive (HDD)), an I/O controller 614, a digital signal processor (not shown), a crypto processor (not shown), a graphics processor 616, one or more antenna 618, a display (not shown), a touch screen display 620, a touch screen controller 622, a battery 624, an audio codec (not shown), a video codec (not shown), a global positioning system (GPS) device 628, a compass 630, an accelerometer (not shown), a gyroscope (not shown), a speaker 632, a camera 634, and a mass storage device (such as hard disk drive, a solid state drive, compact disk (CD), digital versatile disk (DVD)) (not shown), and so forth. In various embodiments, the processor 604 may be integrated on the same die with other components to form a System on Chip (SoC).

In some embodiments, the one or more processor(s) 604, flash memory 612, and/or storage device 611 may include associated firmware (not shown) storing programming instructions configured to enable computing device 600, in response to execution of the programming instructions by one or more processor(s) 604, to practice all or selected aspects of the methods described herein. In various embodiments, these aspects may additionally or alternatively be implemented using hardware separate from the one or more processor(s) 604, flash memory 612, or storage device 611.

In various embodiments, one or more components of the computing device 600 may include the circuit 100, circuit 200, circuit 300, test circuit 122, test circuit 220, and/or test circuit 320 described herein. Additionally, or alternatively, one or more components of the computing device 600 may perform the method 400 and/or method 500. For example, the circuit 100, circuit 200, circuit 300, test circuit 122, test circuit 220, and/or test circuit 320 may be included in processor 604, communication chip 606, I/O controller 614, memory controller 605, and/or another component of computing device 600.

The communication chips 606 may enable wired and/or wireless communications for the transfer of data to and from the computing device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 606 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computing device 600 may include a plurality of communication chips 606. For instance, a first communication chip 606 may be dedicated to shorter range wireless communications such as Wi-Fi and Bluetooth, and a second communication chip 606 may be dedicated to longer range wireless communications such as GPS, EDGE, GPRS, CDMA, WiMAX, LTE, Ev-DO, and others.

In various implementations, the computing device 600 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder. In further implementations, the computing device 600 may be any other electronic device that processes data.

Some non-limiting Examples of various embodiments are presented below.

Example 1 is an apparatus with power profiling capability, comprising: a first power supply network to receive a first power supply; a second power supply network that is different from the first power supply network, the second power supply network to receive a second power supply; a first plurality of circuit blocks, including a first instance of a circuit block, coupled to the first power supply network; a second plurality of circuit blocks, including a second instance of the circuit block, coupled to the second power supply network; one or more first power switches coupled between the first instance of the circuit block and the first power supply network, the one or more first power switches to couple the first instance of the circuit block to the first power supply network during a first test run and to uncouple the first instance of the circuit block from the first power supply network during a second test run; and one or more second power switches coupled between the second instance of the circuit block and the second power supply network, the one or more second power switches to uncouple the second instance of the circuit block to the second power supply network during the first test run and to couple the second instance of the circuit block to the second power supply network during the second test run.

Example 2 is the apparatus of Example 1, further comprising a test circuit to: determine a first difference between a power consumption of the first power supply network and a power consumption of the second power supply network for the first test run; determine a second difference between a power consumption of the first power supply network and a power consumption of the second power supply network for the second test run; and determine a power consumption of the circuit block based on the first and second differences.

Example 3 is the apparatus of Example 1, wherein the circuit block is a first circuit block and wherein the apparatus further includes: a second circuit block; and one or more third power switches to couple the second circuit block to the first power supply network during a third test run and to couple the second circuit block to the second power supply network during a fourth test run to enable determination of a power consumption of the second circuit block.

Example 4 is the apparatus of Example 3, wherein the one or more third power switches include separate switches to couple the second circuit block to the first power supply network and to couple the second circuit block to the second power supply network.

Example 5 is the apparatus of Example 3, wherein individual switches of the one or more third power switches are dual-input switches that are coupled to both the first power supply network and the second power supply network.

Example 6 is the apparatus of Example 1, wherein the first power supply network is coupled to a first power supply pin to receive the first power supply, wherein the second power supply network is coupled to a second power supply pin to receive the second power supply, and wherein the first and second power supply pins are to be coupled to one another during normal operation of the apparatus.

Example 7 is the apparatus of Example 1, wherein other circuit blocks of the plurality of circuit blocks coupled to the first power supply network are coupled to the first power supply network during the first and second test runs.

Example 8 is the apparatus of any one of Examples 1 to 7, further comprising a switch box coupled to the first and second instances of the circuit block, the switch box to: receive an input data signal; pass the input data signal to the first instance of the circuit block during the first test run; and pass the input data signal to the second instance of the circuit block during the second test run.

Example 9 is a method for on-chip power profiling, comprising: during a first test run, coupling a circuit block under test of a circuit, to a first power supply network of the circuit, and uncoupling the circuit block under test from a second power supply network of the circuit; during a second test run, uncoupling the circuit block under test from the first power supply network, and coupling the circuit block under test to the second power supply network, wherein a first plurality of other circuit blocks are coupled to the first power supply network during the first and second test runs and a second plurality of other circuit blocks are coupled to the second power supply network during the first and second test runs; and determining a power consumption of the circuit block under test based on the first and second test runs.

Example 10 is the method of Example 9, wherein the determining the power consumption of the circuit block under test includes: determining a first difference between a power consumption of the first power supply network and a power consumption of the second power supply network for the first test run; determining a second difference between a power consumption of the first power supply network and a power consumption of the second power supply network for the second test run; and determining the power consumption of the circuit block under test based on the first and second differences.

Example 11 is the method of Example 9, wherein the coupling the circuit block to the first power supply network and the uncoupling the circuit block from the second power supply network include controlling one or more dual-input switches that are coupled to the first power supply network and the second power supply network.

Example 12 is the method of Example 9, wherein the coupling the circuit block under test to the first power supply network includes closing one or more first switches coupled between the circuit block under test and the first power supply network, and wherein the uncoupling the circuit block under test from the second power supply network includes opening one or more second switches coupled between the circuit block under test and the second power supply network.

Example 13 is the method of any one of Examples 9 to 12, wherein the circuit block under test is a first circuit block under test, and wherein the method further comprises: during a third test run, coupling a first instance of a second circuit block under test to the first power supply network, and uncoupling a second instance of the second circuit block under test from the second power supply network; during a fourth test run, uncoupling the first instance of the second circuit block under test from the first power supply network, and coupling the second instance of the second circuit block under test to the second power supply network; and determining a power consumption of the second circuit block under test based on the third and fourth test runs.

Example 14 is the method of Example 13, wherein the first plurality of other circuit blocks are coupled to the first power supply network during the first and second test runs and the second plurality of other circuit blocks are coupled to the second power supply network during the first and second test runs.

Example 15 is the method of Example 9, further comprising coupling the first power supply network with the second power supply network for normal operation of the circuit.

Example 16 is a system for on-chip power profiling, comprising an integrated circuit including: a first power supply network coupled to a first supply pin; a second power supply network that is different from the first power supply network, the second power supply network coupled to a second supply pin to receive a second power supply; a first plurality of circuit blocks coupled to the first power supply network during a first test run and a second test run; a second plurality of circuit blocks coupled to the second power supply network during the first and second test runs; and a circuit block under test coupled to the first power supply network by one or more power switches. The system of Example 16 further includes a test circuit coupled to the integrated circuit, the test circuit to: control the one or more power switches to couple the circuit block under test to the first power supply network during the first test run; control the one or more power switches to uncouple the circuit block under test from the first power supply network during the second test run; and determine a power consumption of the circuit block under test based on the first and second test runs.

Example 17 is the system of Example 16, wherein the circuit block under test is a first instance of a first circuit block, wherein the one or more power switches are one or more first power switches, wherein the integrated circuit further includes a second instance of the first circuit block that is coupled to the second power supply network by one or more second power switches, and wherein the test circuit is to: control the one or more second power switches to uncouple the second instance of the first circuit block from the second power supply network during the first test run; and control the one or more second power switches to couple the second instance of the first circuit block to the second power supply network during the second test run.

Example 18 is the system of Example 17, further comprising a switch box coupled to the first and second instances of the first circuit block, the switch box to: receive an input data signal; pass the input data signal to the first instance of the first circuit block during the first test run; and pass the input data signal to the second instance of the first circuit block during the second test run.

Example 19 is the system of Example 16, wherein the test circuit is further to control the one or more power switches to couple the circuit block under test to the second power supply network during the second test run.

Example 20 is the system of Example 19, wherein the one or more power switches include separate switches to couple the circuit block under test to the first power supply network and to couple the circuit block under test to the second power supply network.

Example 21 is the system of Example 19, wherein individual switches of the one or more power switches are dual-input switches that are coupled to both the first power supply network and the second power supply network.

Example 22 is the system of Example 16, wherein, to determine the power consumption of the circuit block under test, the test circuit is to: determine a first difference between a power consumption of the first power supply network and a power consumption of the second power supply network for the first test run; determine a second difference between a power consumption of the first power supply network and a power consumption of the second power supply network for the second test run; and determine the power consumption of the circuit block under test based on the first and second differences.

Example 23 is an apparatus for on-chip power profiling, comprising: means for, during a first test run, coupling a circuit block under test of a circuit, to a first power supply network of the circuit, and uncoupling the circuit block under test from a second power supply network of the circuit; means for, during a second test run, uncoupling the circuit block under test from the first power supply network, and coupling the circuit block under test to the second power supply network, wherein a first plurality of other circuit blocks are coupled to the first power supply network during the first and second test runs and a second plurality of other circuit blocks are coupled to the second power supply network during the first and second test runs; and means for determining a power consumption of the circuit block under test based on the first and second test runs.

Example 24 is the apparatus of Example 23, wherein the means for determining the power consumption of the circuit block under test includes: means for determining a first difference between a power consumption of the first power supply network and a power consumption of the second power supply network for the first test run; means for determining a second difference between a power consumption of the first power supply network and a power consumption of the second power supply network for the second test run; and means for determining the power consumption of the circuit block under test based on the first and second differences.

Example 25 is the apparatus of Example 23, wherein the means for coupling the circuit block to the first power supply network and the means for uncoupling the circuit block from the second power supply network include means for controlling one or more dual-input switches that are coupled to the first power supply network and the second power supply network.

Example 26 is the apparatus of Example 23, wherein the means for coupling the circuit block under test to the first power supply network includes means for closing one or more first switches coupled between the circuit block under test and the first power supply network, and wherein the means for uncoupling the circuit block under test from the second power supply network includes means for opening one or more second switches coupled between the circuit block under test and the second power supply network.

Example 27 is the apparatus of any one of Examples 23 to 26, wherein the circuit block under test is a first circuit block under test, and wherein the apparatus further comprises: means for, during a third test run, coupling a first instance of a second circuit block under test to the first power supply network, and uncoupling a second instance of the second circuit block under test from the second power supply network; means for, during a fourth test run, uncoupling the first instance of the second circuit block under test from the first power supply network, and coupling the second instance of the second circuit block under test to the second power supply network; and means for determining a power consumption of the second circuit block under test based on the third and fourth test runs.

Example 28 is the apparatus of Example 27, wherein the first plurality of other circuit blocks are coupled to the first power supply network during the first and second test runs and the second plurality of other circuit blocks are coupled to the second power supply network during the first and second test runs.

Example 29 is the apparatus of Example 23, further comprising means for coupling the first power supply network with the second power supply network for normal operation of the circuit.

Example 30 is one or more non-transitory computer-readable media having instructions, stored thereon, that when executed by one or more processors of an apparatus cause the apparatus to perform operations including: during a first test run, coupling a circuit block under test of a circuit, to a first power supply network of the circuit, and uncoupling the circuit block under test from a second power supply network of the circuit; during a second test run, uncoupling the circuit block under test from the first power supply network, and coupling the circuit block under test to the second power supply network, wherein a first plurality of other circuit blocks are coupled to the first power supply network during the first and second test runs and a second plurality of other circuit blocks are coupled to the second power supply network during the first and second test runs; and determining a power consumption of the circuit block under test based on the first and second test runs.

Example 31 is the one or more media of Example 30, wherein the determining the power consumption of the circuit block under test includes: determining a first difference between a power consumption of the first power supply network and a power consumption of the second power supply network for the first test run; determining a second difference between a power consumption of the first power supply network and a power consumption of the second power supply network for the second test run; and determining the power consumption of the circuit block under test based on the first and second differences.

Example 32 is the one or more media of Example 30, wherein the coupling the circuit block to the first power supply network and the uncoupling the circuit block from the second power supply network include controlling one or more dual-input switches that are coupled to the first power supply network and the second power supply network.

Example 33 is the one or more media of Example 30, wherein the coupling the circuit block under test to the first power supply network includes closing one or more first switches coupled between the circuit block under test and the first power supply network, and wherein the uncoupling the circuit block under test from the second power supply network includes opening one or more second switches coupled between the circuit block under test and the second power supply network.

Example 34 is the one or more media of any one of Examples 30 to 33, wherein the circuit block under test is a first circuit block under test, and wherein the operations further include: during a third test run, coupling a first instance of a second circuit block under test to the first power supply network, and uncoupling a second instance of the second circuit block under test from the second power supply network; during a fourth test run, uncoupling the first instance of the second circuit block under test from the first power supply network, and coupling the second instance of the second circuit block under test to the second power supply network; and determining a power consumption of the second circuit block under test based on the third and fourth test runs.

Example 35 is the one or more media of Example 34, wherein the first plurality of other circuit blocks are coupled to the first power supply network during the first and second test runs and the second plurality of other circuit blocks are coupled to the second power supply network during the first and second test runs.

Example 36 is the one or more media of Example 30, wherein the operations further include coupling the first power supply network with the second power supply network for normal operation of the circuit.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

What is claimed is:

1. An apparatus comprising:
a first power supply network to receive a first power supply;
a second power supply network that is different from the first power supply network, the second power supply network to receive a second power supply;
a first plurality of circuit blocks, including a first instance of a circuit block, coupled to the first power supply network;
a second plurality of circuit blocks, including a second instance of the circuit block, coupled to the second power supply network;
one or more first power switches coupled between the first instance of the circuit block and the first power supply network, the one or more first power switches to couple the first instance of the circuit block to the first power supply network during a first test run and to uncouple the first instance of the circuit block from the first power supply network during a second test run;
one or more second power switches coupled between the second instance of the circuit block and the second power supply network, the one or more second power switches to uncouple the second instance of the circuit block from the second power supply network during the first test run and to couple the second instance of the circuit block to the second power supply network during the second test run; and
a test circuit to:
determine a first difference between a power consumption of the first power supply network and a power consumption of the second power supply network for the first test run;
determine a second difference between a power consumption of the first power supply network and a power consumption of the second power supply network for the second test run; and
determine a power consumption of the circuit block based on the first and second differences.

2. The apparatus of claim 1, wherein the circuit block is a first circuit block and wherein the apparatus further includes:
a second circuit block; and
one or more third power switches to couple the second circuit block to the first power supply network during a third test run and to couple the second circuit block to the second power supply network during a fourth test run to enable determination of a power consumption of the second circuit block.

3. The apparatus of claim 2, wherein the one or more third power switches include separate switches to couple the second circuit block to the first power supply network and to couple the second circuit block to the second power supply network.

4. The apparatus of claim 2, wherein individual switches of the one or more third power switches are dual-input switches that are coupled to both the first power supply network and the second power supply network.

5. The apparatus of claim 1, wherein the first power supply network is coupled to a first power supply pin to receive the first power supply, wherein the second power supply network is coupled to a second power supply pin to receive the second power supply, and wherein the first and second power supply pins are to be coupled to one another during normal operation of the apparatus.

6. The apparatus of claim 1, wherein other circuit blocks of the first plurality of circuit blocks are coupled to the first power supply network during the first and second test runs.

7. The apparatus of claim 1, further comprising a switch box coupled to the first and second instances of the circuit block, the switch box to:
receive an input data signal;
pass the input data signal to the first instance of the circuit block during the first test run; and
pass the input data signal to the second instance of the circuit block during the second test run.

8. A method comprising:
during a first test run, coupling a circuit block under test of a circuit to a first power supply network of the circuit, and uncoupling the circuit block under test from a second power supply network of the circuit;
during a second test run, uncoupling the circuit block under test from the first power supply network, and coupling the circuit block under test to the second power supply network, wherein a first plurality of other circuit blocks are coupled to the first power supply network during the first and second test runs and a second plurality of other circuit blocks are coupled to the second power supply network during the first and second test runs;
determining a first difference between a power consumption of the first power supply network and a power consumption of the second power supply network for the first test run;
determining a second difference between a power consumption of the first power supply network and a power consumption of the second power supply network for the second test run; and
determining a power consumption of the circuit block under test based on the first and second differences.

9. The method of claim 8, wherein the coupling the circuit block to the first power supply network and the uncoupling the circuit block from the second power supply network include controlling one or more dual-input switches that are coupled to the first power supply network and the second power supply network.

10. The method of claim 8, wherein the coupling the circuit block under test to the first power supply network includes closing one or more first switches coupled between the circuit block under test and the first power supply network, and wherein the uncoupling the circuit block under test from the second power supply network includes opening one or more second switches coupled between the circuit block under test and the second power supply network.

11. The method of claim 8, wherein the circuit block under test is a first circuit block under test, and wherein the method further comprises:
during a third test run, coupling a first instance of a second circuit block under test to the first power supply network, and uncoupling a second instance of the second circuit block under test from the second power supply network;
during a fourth test run, uncoupling the first instance of the second circuit block under test from the first power supply network, and coupling the second instance of the second circuit block under test to the second power supply network; and
determining a power consumption of the second circuit block under test based on the third and fourth test runs.

12. The method of claim 11, wherein the first plurality of other circuit blocks are coupled to the first power supply network during the first and second test runs and the second plurality of other circuit blocks are coupled to the second power supply network during the first and second test runs.

13. The method of claim 8, further comprising coupling the first power supply network with the second power supply network for normal operation of the circuit.

14. A system comprising:
an integrated circuit including:
a first power supply network coupled to a first supply pin;
a second power supply network that is different from the first power supply network, the second power supply network coupled to a second supply pin to receive a second power supply;
a first plurality of circuit blocks coupled to the first power supply network during a first test run and a second test run;
a second plurality of circuit blocks coupled to the second power supply network during the first and second test runs; and
a circuit block under test coupled to the first power supply network by one or more power switches; and
a test circuit coupled to the integrated circuit, the test circuit to:
control the one or more power switches to couple the circuit block under test to the first power supply network during the first test run;
control the one or more power switches to uncouple the circuit block under test from the first power supply network during the second test run;
determine a first difference between a power consumption of the first power supply network and a power consumption of the second power supply network for the first test run;
determine a second difference between a power consumption of the first power supply network and a power consumption of the second power supply network for the second test run; and
determine a power consumption of the circuit block under test based on the first and second differences.

15. The system of claim 14, wherein the circuit block under test is a first instance of a first circuit block, wherein the one or more power switches are one or more first power switches, wherein the integrated circuit further includes a second instance of the first circuit block that is coupled to the second power supply network by one or more second power switches, and wherein the test circuit is to:
control the one or more second power switches to uncouple the second instance of the first circuit block from the second power supply network during the first test run; and
control the one or more second power switches to couple the second instance of the first circuit block to the second power supply network during the second test run.

16. The system of claim 15, further comprising a switch box coupled to the first and second instances of the first circuit block, the switch box to:
receive an input data signal;
pass the input data signal to the first instance of the first circuit block during the first test run; and
pass the input data signal to the second instance of the first circuit block during the second test run.

17. The system of claim 14, wherein the test circuit is further to control the one or more power switches to couple the circuit block under test to the second power supply network during the second test run.

18. The system of claim 17, wherein the one or more power switches include separate switches to couple the circuit block under test to the first power supply network and to couple the circuit block under test to the second power supply network.

19. The system of claim 17, wherein individual switches of the one or more power switches are dual-input switches that are coupled to both the first power supply network and the second power supply network.

* * * * *